United States Patent
Han et al.

(10) Patent No.: US 10,983,237 B2
(45) Date of Patent: Apr. 20, 2021

(54) ENHANCING SEISMIC IMAGES

(71) Applicant: Saudi Arabian Oil Company, Dhahran (SA)

(72) Inventors: Song Han, Beijing (CN); Tong Wang Fei, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 420 days.

(21) Appl. No.: 15/952,615

(22) Filed: Apr. 13, 2018

(65) Prior Publication Data

US 2019/0317234 A1    Oct. 17, 2019

(51) Int. Cl.
*G01V 1/36* (2006.01)
*G01V 1/30* (2006.01)
*G01V 1/34* (2006.01)

(52) U.S. Cl.
CPC ............. *G01V 1/366* (2013.01); *G01V 1/301* (2013.01); *G01V 1/345* (2013.01); *G01V 2210/322* (2013.01)

(58) Field of Classification Search
None
See application file for complete search history.

(56) References Cited

U.S. PATENT DOCUMENTS

| | | | | |
|---|---|---|---|---|
| 2,978,673 A | * | 4/1961 | Graham | G01V 1/24 367/49 |
| 3,014,551 A | * | 12/1961 | Chapanis | G01V 1/366 367/40 |
| 3,196,385 A | * | 7/1965 | Smith | G01V 1/32 346/33 C |
| 3,281,774 A | * | 10/1966 | Alexander | G01V 1/288 367/40 |
| 3,719,924 A | * | 3/1973 | Muir | G01V 1/20 367/56 |
| 4,208,732 A | | 6/1980 | Ruehle | |

(Continued)

FOREIGN PATENT DOCUMENTS

| | | | | |
|---|---|---|---|---|
| WO | WO 2008/048697 | * | 4/2008 | ............. G01V 1/303 |
| WO | WO2012118866 | | 9/2012 | |

(Continued)

OTHER PUBLICATIONS

Al Ibrahim and Mustafa, "Multi-scale sequence stratigraphy, cyclostratigraphy, and depositional environment of carbonate mudrocks in the Tuwaiq Mountain and Hanifa formations, Saudi Arabia," Diss. Colorado School of Mines, Arthur Lakes Library, 2014, 208 pages.

(Continued)

*Primary Examiner* — Tung S Lau
(74) *Attorney, Agent, or Firm* — Fish & Richardson P.C.

(57) ABSTRACT

A method of enhancing seismic images includes receiving a seismic gather. The seismic gather includes a plurality of seismic traces. A feature trace is generated based on the plurality of seismic traces in the seismic gather. For each of the plurality of seismic traces in the seismic gather, a correlation trace is generated based on that seismic trace and the feature trace, the correlation trace is modified using an activation function, and an enhanced trace is generated by multiplying that seismic trace with the modified correlation trace.

17 Claims, 4 Drawing Sheets

(56) References Cited

U.S. PATENT DOCUMENTS

| | | | |
|---|---|---|---|
| 4,542,648 A | | 9/1985 | Vinegar et al. |
| 4,969,129 A | * | 11/1990 | Currie .................... G01V 1/375 367/41 |
| 5,181,171 A | | 1/1993 | McCormack et al. |
| 5,191,557 A | * | 3/1993 | Rector .................... G01V 1/375 367/41 |
| 5,475,589 A | * | 12/1995 | Armitage ................. G01V 1/30 367/38 |
| 6,088,656 A | | 7/2000 | Ramakrishnan et al. |
| 6,574,565 B1 | | 6/2003 | Bush |
| 6,775,619 B2 | | 8/2004 | Nyland |
| 7,363,158 B2 | | 4/2008 | Stelting et al. |
| 7,925,481 B2 | | 4/2011 | Van Wagoner |
| 7,970,545 B2 | | 6/2011 | Sanstrom |
| 8,081,796 B2 | | 12/2011 | Derzhi et al. |
| 8,170,799 B2 | | 5/2012 | Dvorkin et al. |
| 8,184,502 B2 | | 5/2012 | Xu et al. |
| 8,234,923 B2 | | 8/2012 | Ramamurthy et al. |
| 8,380,642 B2 | | 2/2013 | Stundner et al. |
| 8,385,604 B2 | | 2/2013 | Orpen |
| 8,473,213 B2 | | 6/2013 | Zhu et al. |
| 8,583,410 B2 | | 11/2013 | Sisk et al. |
| 8,605,951 B2 | | 12/2013 | Baggs et al. |
| 8,938,045 B2 | | 1/2015 | Dvorkin et al. |
| 9,046,509 B2 | | 6/2015 | Dvorkin et al. |
| 9,047,513 B2 | | 6/2015 | Derzhi et al. |
| 9,201,026 B2 | | 12/2015 | Walls et al. |
| 9,262,713 B2 | | 2/2016 | Shelley et al. |
| 10,295,685 B2 | * | 5/2019 | Zhang .................... G01V 1/303 |
| 2002/0042677 A1 | | 4/2002 | West |
| 2003/0044061 A1 | | 3/2003 | Prempraneerach |
| 2007/0061079 A1 | | 3/2007 | Hu |
| 2007/0239359 A1 | | 10/2007 | Stelting et al. |
| 2009/0259446 A1 | | 10/2009 | Zhang et al. |
| 2010/0057409 A1 | | 3/2010 | Jones et al. |
| 2010/0198638 A1 | | 8/2010 | Deffenbaugh et al. |
| 2010/0305927 A1 | | 12/2010 | Suarez-Rivera et al. |
| 2011/0103184 A1 | | 5/2011 | Westeng et al. |
| 2011/0191080 A1 | | 8/2011 | Klie |
| 2011/0218950 A1 | | 9/2011 | Mirowski |
| 2012/0150510 A1 | | 6/2012 | Safonov et al. |
| 2012/0221306 A1 | | 8/2012 | Hurley et al. |
| 2012/0275658 A1 | | 11/2012 | Hurley et al. |
| 2012/0277996 A1 | | 11/2012 | Hurley et al. |
| 2012/0281883 A1 | * | 11/2012 | Hurley ............... G01N 21/6458 382/109 |
| 2013/0013209 A1 | | 1/2013 | Zhu et al. |
| 2013/0028051 A1 | * | 1/2013 | Barkved ................ G01V 1/288 367/40 |
| 2013/0080133 A1 | | 3/2013 | Sung et al. |
| 2013/0297272 A1 | | 11/2013 | Sung et al. |
| 2013/0297273 A1 | | 11/2013 | Altundas et al. |
| 2014/0114627 A1 | * | 4/2014 | Jones ..................... G06F 30/20 703/2 |
| 2015/0129147 A1 | * | 5/2015 | Sumnicht ................ A47L 13/16 162/146 |
| 2015/0241591 A1 | | 8/2015 | Burmester et al. |
| 2016/0109593 A1 | | 4/2016 | Saxena et al. |
| 2016/0146973 A1 | | 5/2016 | Johnson et al. |
| 2016/0161635 A1 | | 6/2016 | Ramsay et al. |
| 2016/0307312 A1 | | 10/2016 | Sungkorn et al. |
| 2016/0341707 A1 | | 11/2016 | Inan |
| 2019/0179043 A1 | * | 6/2019 | Qin ......................... G01V 1/36 |
| 2019/0271793 A1 | | 9/2019 | Wilson et al. |
| 2019/0353812 A1 | * | 11/2019 | Zhang .................... G01V 1/345 |
| 2019/0353813 A1 | | 11/2019 | Cobos et al. |
| 2020/0040717 A1 | | 2/2020 | Feng et al. |
| 2020/0063532 A1 | * | 2/2020 | Crouse ................. E21B 43/166 |

FOREIGN PATENT DOCUMENTS

| | | |
|---|---|---|
| WO | WO2012118868 | 9/2012 |
| WO | 2013149126 | 10/2013 |
| WO | 2015/127349 A1 | 8/2015 |
| WO | 2015/127349 A1 | 8/2015 |
| WO | WO2016012826 | 1/2016 |
| WO | 2017/011658 | 1/2017 |

OTHER PUBLICATIONS

Assous et al., "Microresistivity borehole image inpainting," Geophysics vol. 79 No. 2, Mar.-Apr. 2014, 9 pages.

Hurley et al., "Method to Generate Fullbore Images Using Borehole Images and Multi-point Statistics," SPE 120671, SPE Middle East Oil and Gas Show and Conference, Society of Petroleum Engineers, Mar. 15-18, 2009, 18 pages.

GCC Examination Report in GCC Appln. No. GC 2019-37366, dated May 18, 2020, 4 pages.

Canadian Office Action issued in Canadian Application No. 3019124 dated Jul. 12, 2019, 5 pages.

International Search Report and Written Opinion issued in International Application No. PCT/US2018/051066 dated Nov. 26, 2018, 16 pages.

Sheppard et al., "Techniques for image enhancement and segmentation of tomographic images of porous materials," Physica A: Statistical Mechanics and its Applications, vol. 339, No. 1-2, Aug. 1, 2004, 7 pages.

Zeljkovic et al., "An algorithm for petro-graphic colour image segmentation used for oil exploration," High Performance Computing and Simulation (HPCS), 2011 International Conference on IEEE, Jul. 4, 2011, 6 pages.

Zhou et al., "Segmentation of petrographic images by integrating edge detection and region growing," Computers and Geosciences, Pergamon Press, vol. 30, No. 8, Oct. 1, 2004, 15 pages.

Communication Pursuant to Rules 161(1) and 162 EPC in European Application No. 17718181.5 dated Nov. 8, 2018, 3 pages.

Anonymous: "Hoshen-Kopelman algorithm-Wi kipedia", is Jun. 2018 (Jun. 18, 2018), XP055616204, Retrieved from the Internet: URL: https://en.wikipedia.org/w/index.php?title=Hoshen-Kopelman_algorithm&oldid=846451608 [retrieved on Aug. 28, 2019] 5 pages.

International Search Report and Written Opinion issued in International Application No. PCT/US2019/038904 dated Sep. 6, 2019, 16 pages.

International Search Report and Written Opinion issued in International Application No. PCT/US2019/024763 dated Jun. 26, 2019, 16 pages.

Giboli et al., "Reverse time migration surface offset gathers part 1: a new method to produce classical common image gathers," SEG Technical Program Expanded Abstracts 2012, Sep. 1, 2012, 6 pages.

Thomas et al.; "Rock Physics and Formation Evaluation: Automated Lithology Extraction from Core Photographs" First Break, vol. 29; Jun. 1, 2011; pp. 103-109.

Chai et al., "Automatic discrimination of sedimentary facies and lithologies in reef-bank reservoirs using borehole image logs," Applied Geophysics, 2009, vol. 6, No. 1; pp. 17-29.

Yin et al., "FMI image based rock structure classification using classifier combination," Neural Computing and Applications, 2011, vol. 20, No. 7; pp. 955-963.

Barton et al., "Interactive image analysis of borehole televiewer data. Automated pattern analysis in petroleum exploration," Springer New York, 1992; pp. 223-248.

International Search Report and Written Opinion of the International Searching Authority issued in International Application No. PCT/US2017/024776 dated Jun. 19, 2017; 11 pages.

PCT International Search Report and Written Opinion of the International Searching Authority issued in International Application No. PCT/US2015/022492 dated Aug. 4, 2015; 11 pages.

Office Action issued in GCC Application No. 2015/29123 dated Jan. 10, 2018; 5 pages.

Anselmetti et al., "Quantitative characterization of carbonate pore systems by digital image analysis," AAPG Bulletin, vol. 82, No. 10, Oct. 1998, 22 pages.

DMT; "DMT CoreScan 3 High-Tech Core Logging Tool"; http://www.corescan.de/fileadmin/downloads/DMT_CoreScan3_Info.pdf; Jan. 31, 2013; pp. 1-20.

(56) References Cited

OTHER PUBLICATIONS

Gaillot et al.; "Contribution of Borehole Digital Imagery in Core-Logic-Seismic Integration"; Scientific Drilling, No. 5; Sep. 2007; pp. 50-53.
Hoshen and Kopelman, "Percolation and cluster distribution, I. cluster multiple labeling technique and critical concentration algorithm," Physical Review Board, vol. 14, No. 8, Oct. 15, 1976, 8 pages.
Paulsen et al.; "A Simple Method for Orienting Drill Core by Correlating Features in Whole-Core Scans and Oriented Borehole-Wall Imagery"; Journal of Structural Geology; Published in 2002; pp. 1233-1238.
Selezney et al., "Formation properties derived from a multi-frequency dielectric measurement," SPWLA 47th Annual Logging Symposium, Jun. 4-7, 2006, 12 pages.
Teagle et al.; "Methods" Proceedings of the Integrated Ocean Drilling Program, vol. 309/312; Published in 2006; pp. 1-70.
Vanorio et al., "How mecrite content affects and the transport, seismic and reactive properties of carbonate rocks: Implications for 4D seismic," SEG International Exposition and Annual Meeting, Houston, Oct. 25-30, 2009, 5 pages.
Weger et al., "Quantification of pore structure and its effect on sonic velocity and permeability in carbonates," AAPG Bulletin, vol. 93, No. 10, Oct. 2009, 21 pages.
WellCAD Software, "4.4 Book 1—Basics," V2011.10.17, ALT, Oct. 17, 2011, 11 pages.
Wilkens et al.; "Data Report: Digital Core Images as Data: An Example from IODP Expedition 303"; Proceedings of the Integrated Ocean Drilling Program, vol. 303/306; Published in 2009; pp. 1-16.
EPO Communication Pursuant to Article 94(3) EPC in European Application No. 17718181.5, dated Oct. 8, 2020, 5 pages.

\* cited by examiner

ENHANCING SEISMIC IMAGES

BACKGROUND

Seismic data can be collected for a target region including one or more subsurface layers by sending seismic waves to the target region at multiple source locations and recording reflected waves at multiple receiver locations. The seismic data can be used to build seismic images for analyzing subsurface structure and lithology of the target region so that effective oil and gas exploration can be performed.

SUMMARY

The present disclosure describes enhancing seismic images.

In an implementation, a seismic gather is received. The seismic gather includes a plurality of seismic traces. A feature trace is generated based on the plurality of seismic traces in the seismic gather. For each of the plurality of seismic traces in the seismic gather, a correlation trace is generated based on that seismic trace and the feature trace, the correlation trace is modified using an activation function, and an enhanced trace is generated by multiplying that seismic trace with the modified correlation trace.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. The described approach reduces undesired components (for example, noise or unreliable data) in the seismic data and improves signal-to-noise ratios, which enhances the quality of final seismic images.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
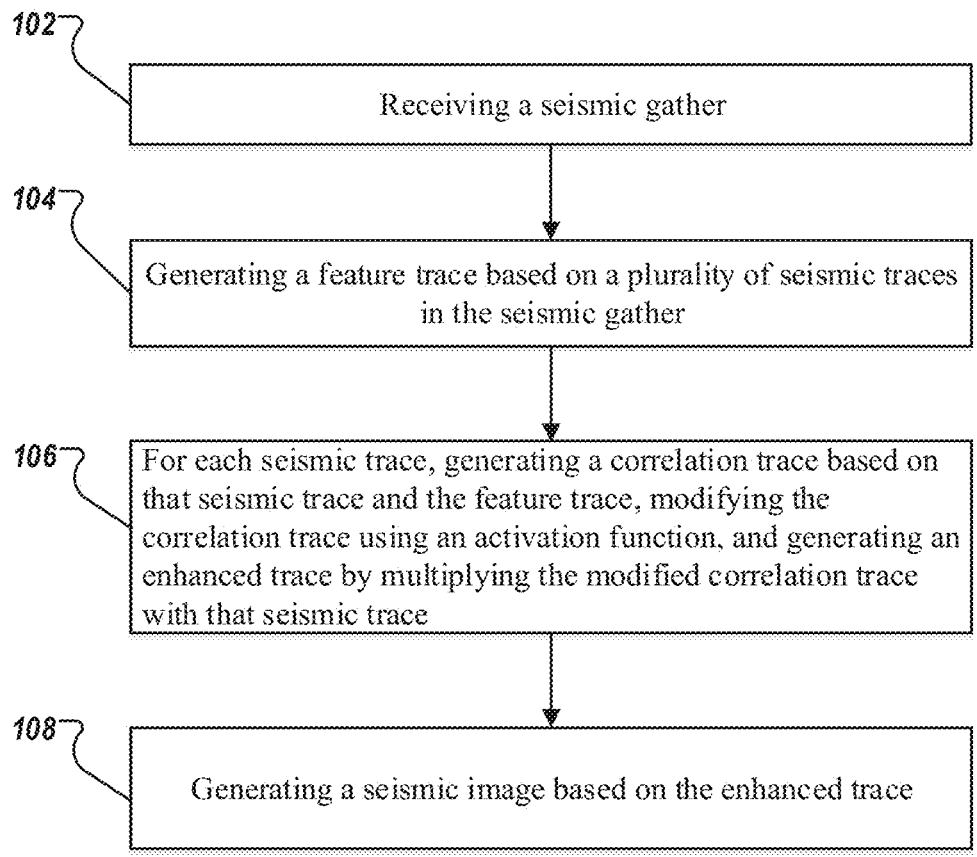
FIG. 1 is a flowchart illustrating an example of a computer-implemented method for enhancing seismic images, according to some implementations of the present disclosure.

The following detailed description describes enhancing seismic images, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Seismic data can be collected for a target region including one or more subsurface layers by sending seismic waves to the target region at multiple source locations and recording reflected waves at multiple receiver locations. In some cases, in addition to reflected waves, other types of waves may also be recorded such as direct waves, diving waves, and surface waves. After data processing, reflected waves are remained while other types of waves are removed. The seismic data can be used to build seismic images for providing information of subsurface structure and lithology of the target region to reveal possible crude oil- and natural gas-bearing formations. For example, a seismic source can fire a shot at a source location for a receiver to record the reflected wave. The recorded data at each receiver corresponding to a single shot is called a trace. The trace can include sampled values of the reflected wave by sampling the reflected wave at a regular time interval. In some cases, a collection of seismic traces that share a common geometric attribute (for example, a common acquisition parameter) is called a seismic gather.

At a high level, the described approach improves seismic traces by reducing undesired components (such as noise or unreliable data) when such undesired components can degrade final seismic images. The improved seismic traces can be used to generate enhanced seismic images for effective drilling of wells or generating drilling parameters to explore oil and gas. In some implementations, one or more seismic gathers are received. Each gather includes multiple seismic traces. For each gather, a feature trace is generated using the seismic traces in that gather. Each seismic trace in that gather correlates with the feature trace to generate a correlation trace that includes a set of correlation coefficients. The correlation trace is modified by applying an activation function to each correlation coefficient. The modified correlation trace is also called a feature map. Each seismic trace is updated by multiplying the original seismic trace with the feature map. Enhanced seismic images can be generated based on the updated seismic traces. By multiplying with the feature map, undesired components in the original trace are reduced.

FIG. 1 is a flowchart illustrating an example of a computer-implemented method 100 for enhancing seismic images, according to some implementations of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, one or more seismic gathers are received. Each seismic gather includes multiple seismic traces that share a common geometric attribute (for example, a common acquisition parameter). In some implementations, the received seismic gathers are migrated common image gathers (CIGs), such as angle-domain CIGs (ADCIGs). Each CIG can correspond to a fixed surface location. The received CIGs can be a byproduct of migration and generated by migration algorithms at every surface location in a Cartesian or Cylindrical coordinate system. For example, in a migration process, subsurface offset domain CIGs (ODCIGs) are first generated by correlating source and receiver wavefields with an opposite offset around an imaging point. Linear Radon transformation is then applied to generate ADCIGs from ODCIGs. In some cases, the traces in the CIGs can be a function of time or depth. As understood by one of ordinary skill in the art, the described approach may be applied to other seismic gathers such as ODCIGs, ADCIGs, and common midpoint gathers (CMPs). From 102, method 100 proceeds to 104.

At 104, for each gather, a feature trace is generated. In some implementations, the feature trace of a gather can be generated by stacking or summing the traces in that gather. The feature trace can also be derived using other methods, for instance, supervised machine learning, or simply importing a feature trace from an external source. The feature trace and the traces in the gather can have a same number of data samples. The feature trace serves as a representative signal for the gather. From 104, method 100 proceeds to 106.

At 106, for each trace in a gather, a correlation trace is calculated using that trace and the feature trace of that gather. The correlation trace includes a set of correlation coefficients. The correlation trace is then modified by applying an activation function to each correlation coefficient in the correlation trace. The modified correlation trace is also called a feature map. Each trace in the gather has its own feature map. In some implementations, the correlation trace is generated by correlating the original trace with the feature trace of the gather. The correlation trace can be a function of time or depth. Each correlation coefficient in the correlation trace represents an inner product of a segment of the feature trace and a segment of the original trace. The two segments are selected from the feature trace and the original trace separately, centered at a time where the correlation coefficient resides. For example, the correlation trace can be calculated by $$C(\tau) = \sum_{it=\tau-nw}^{\tau+nw} A(it)B(it), \quad (1)$$

where $A(it)$ is the original trace, $B(it)$ is the feature trace, and nw represents a half size of a correlation window. The size of the correlation window is smaller than the length of the feature trace or the original trace, and can be specified by a user or an algorithm. The number of correlation coefficients in the correlation trace can be the same as the number of data samples in the feature trace and the original trace. In other words, one original trace gather generates one correlation trace gather, and both gathers have the same size.

After calculating a correlation trace for each original trace in the gather, an activation function is applied to the correlation trace to generate a feature map for that original trace. The activation function can be applied to each correlation coefficient in the correaltion trace. In some implementations, the activation function can be a sigmoid function (also called a logistic function) or other types of functions such as a rectified linear unit. Parameters in the activation function can be adjusted for suppressing undesired components in the original traces. For example, the sigmoid function $f(x)=1/(1+e^{-x})$ can be used, and the feature map can be generated by $$f(\tau)=1/(1+e^{-C(\tau)}), \quad (2)$$

where $C(\tau)$ is calculated using Equation (1).

After calculating a feature map for each original trace, an enhanced trace is generated by multiplying the original trace sample-by-sample with the feature map. By multiplying with the feature map, undesired signal components in the original trace is reduced. As discussed earlier, the feature trace can be considered as a representative signal or desired signal components of the gather. The correlation coefficients in the correlation trace indicate resemblance between the original trace and the feature trace. A negative correlation coefficient indicates undesired signal components of the original trace to be suppressed, while a positive correlation coefficient indicates desired signal components of the original trace to be remained. By applying the activation function in Equation (2), a negative correlation coefficient $C(\tau)$ provides a feature map value $f(\tau) \ll 1$, while a positive correlation coefficient $C(\tau)$ provides a feature map value $f(\tau) \approx 1$. As a result, by multiplying with the feature map, the undesired signal components in the original trace is suppressed by the less feature map value, while the desired signal components remain.

The following example further illustrates operations performed in steps 104 and 106. Assume that a gather has 10 traces, denoted as $A_1, \ldots A_{10}$. Each trace has 100 data samples. For instance, the data samples in the first trace are denoted as $A_1(0), A_1(99)$, the data samples in the second trace are denoted as $A_2(0), \ldots A_2(99)$, and so on. A feature trace B for the gather is generated by stacking the 10 traces. The feature trace B has 100 data points, denoted as $B(0), \ldots, B(99)$, where $$B(i) = \sum_{j=1}^{10} A_j(i), i=0, \ldots 99.$$

The correlation trace for the j-th original trace, denoted as $C_j$ and also called j-th correlation trace, is generated using Equation (1). The j-th correlation trace $C_j$ has 100 data points, denoted as $C_j(0), \ldots C_j(99)$. For example, assume that the correlation window nw equals 20, using Equation (1), $C_j(0)$ and $C_j(20)$ are calculated as $$C_1(0) = \sum_{i=-20}^{20} A_j(i)B(i) = \sum_{i=0}^{20} A_j(i)B(i) \text{ and}$$

$$C_1(20) = \sum_{i=-20}^{20} A_j(i)B(i),$$

respectively. The j-th correlation trace is further modified by the activation function to generate the j-th feature map for the j-th original trace, denoted as $f_j$, using Equation (2). The j-th feature map has 100 data points denoted as $f_j(0), \ldots, f_j(99)$, where $$f_j(i) = 1/(1+e^{-C_j(i)}), i=0, \ldots, 99.$$

The j-th enhanced trace for the j-th original trace, denoted as Ej, is generated by multiplying the j-th original trace with the j-th feature map. The j-th enhanced trace has 100 data points, denoted as $E_j(0), \ldots, E_j(99)$, where $$E_j(i)=f_j(i)A_j(i), i=0,\ldots,99.$$

The enhanced trace Ej can have a greater signal-to-noise ratio by reducing undesired signal components in the original trace. From 106, method 100 proceeds to 108.

At 108, a seismic image is generated based on the enhanced traces. For example, the enhanced traces in a same gather are stacked to form a final migrated seismic image. The seismic image provides information of subsurface structure or lithology to reveal possible oil and gas formations. Based on the seismic image, oil wells can be drilled or drilling parameters can be generated or updated for effective oil and gas exploration. After 108, method 100 stops.

Figure 2:
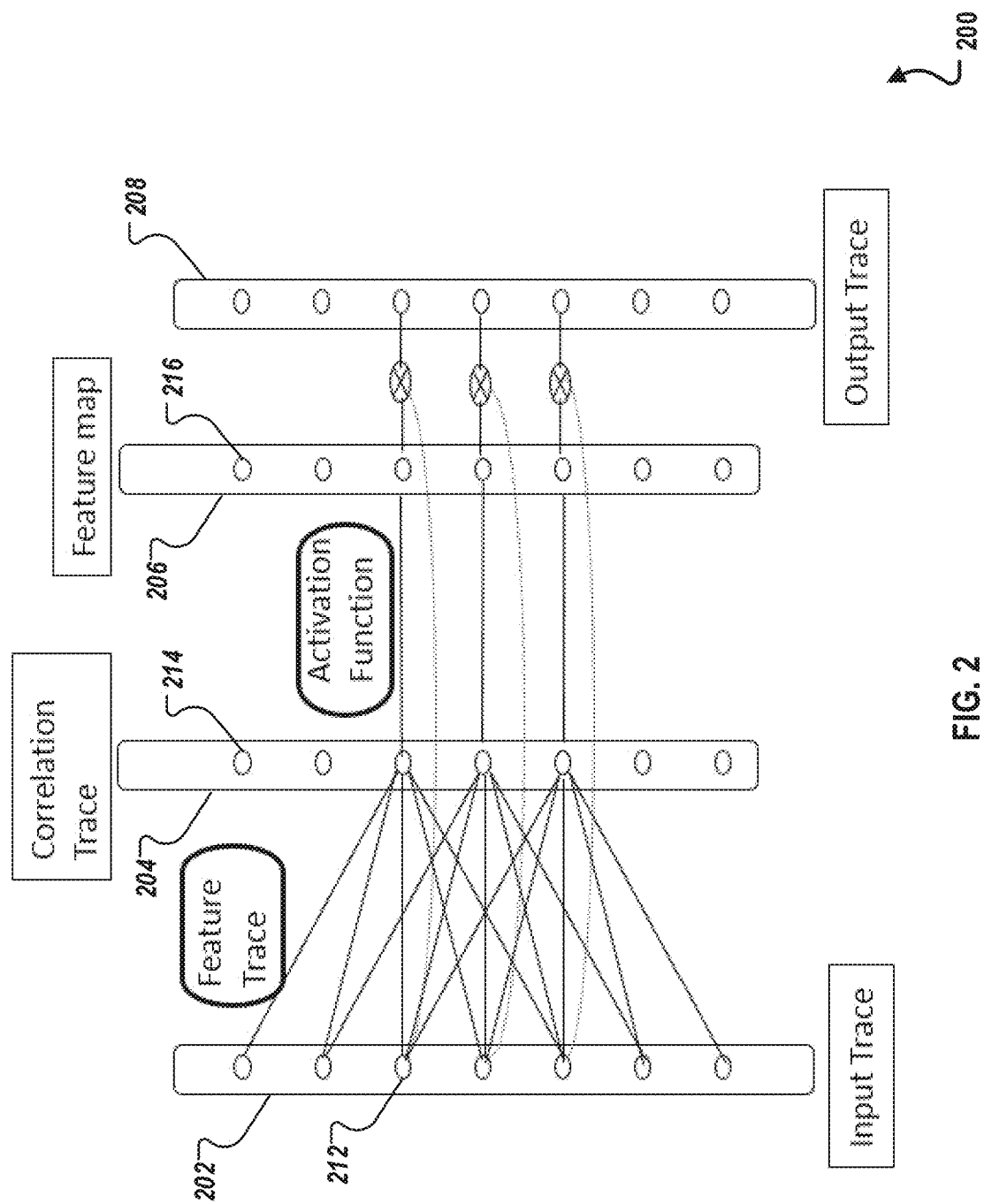
FIG. 2 is a diagram illustrating data transformations for enhancing seismic images, according to some implementations of the present disclosure.

FIG. 2 is a diagram 200 illustrating data transformations for enhancing seismic images, according to some implementations of the present disclosure. The diagram 200 includes an input trace 202 from a gather, where each point 212 in the input trace 202 represents a data sample of the input trace 202. As described in step 106, a correlation trace 204 is generated based on the input trace 202 and a feature trace. Each data point 214 of the correlation trace 204 is generated using multiple data points 212 of the input trace 202 within a correlation window. A feature map 206 is generated by applying an activation function to each data point 214 of the correlation trace 204. An enhanced output trace 208 is generated by sample-by-sample multiplying data points 216 of the feature map 206 with data points 212 of the input trace 202. As illustrated in FIG. 2, the input trace 202, the correlation trace 204, the feature map 206, and output trace 208 have the same number of data points.

Figure 3A:
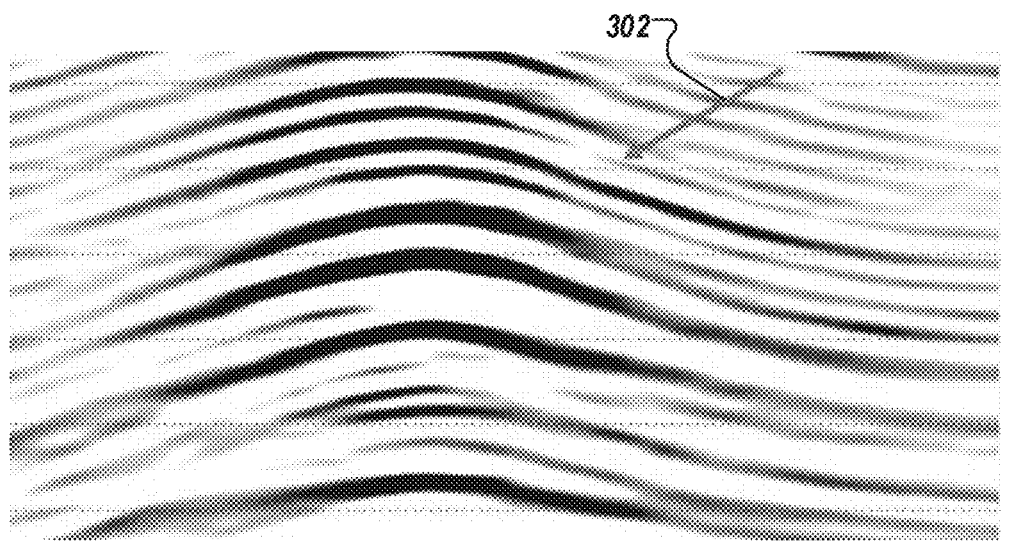
FIGS. 3A and 3B illustrate an enhanced seismic image, according to some implementations of the present disclosure.
Figure 3B:
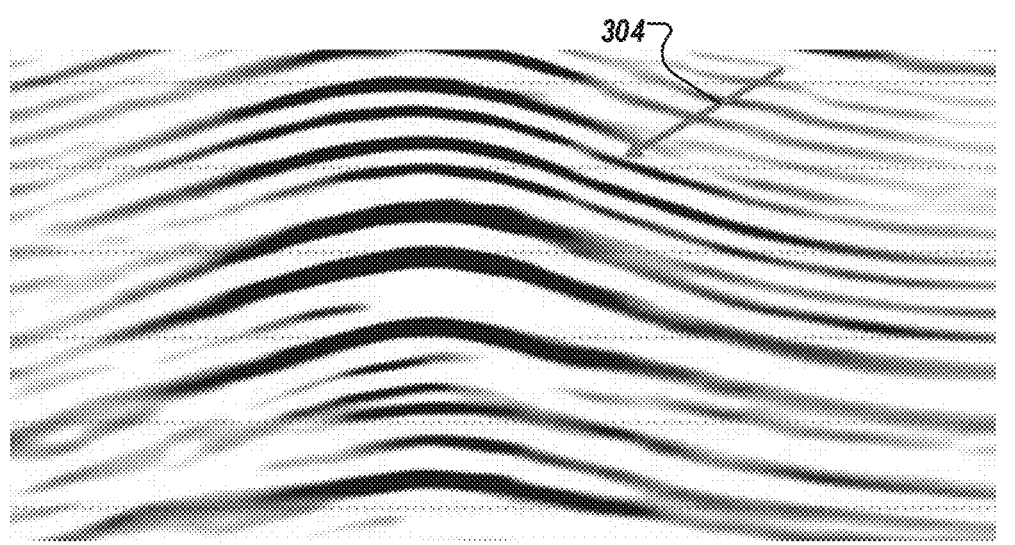

FIGS. 3A and 3B illustrate an enhanced seismic image, according to some implementations of the present disclosure. FIG. 3A illustrates an original stacked seismic image 300a without using the described approach, and FIG. 3B illustrates an enhanced stacked seismic image 300b using the described approach. An arrow 302 in FIG. 3A illustrates an image area degraded by undesired signal components, while an arrow 304 in FIG. 3B illustrates that the same image area is enhanced by reducing undesired signal components using the described approach.

Figure 4:
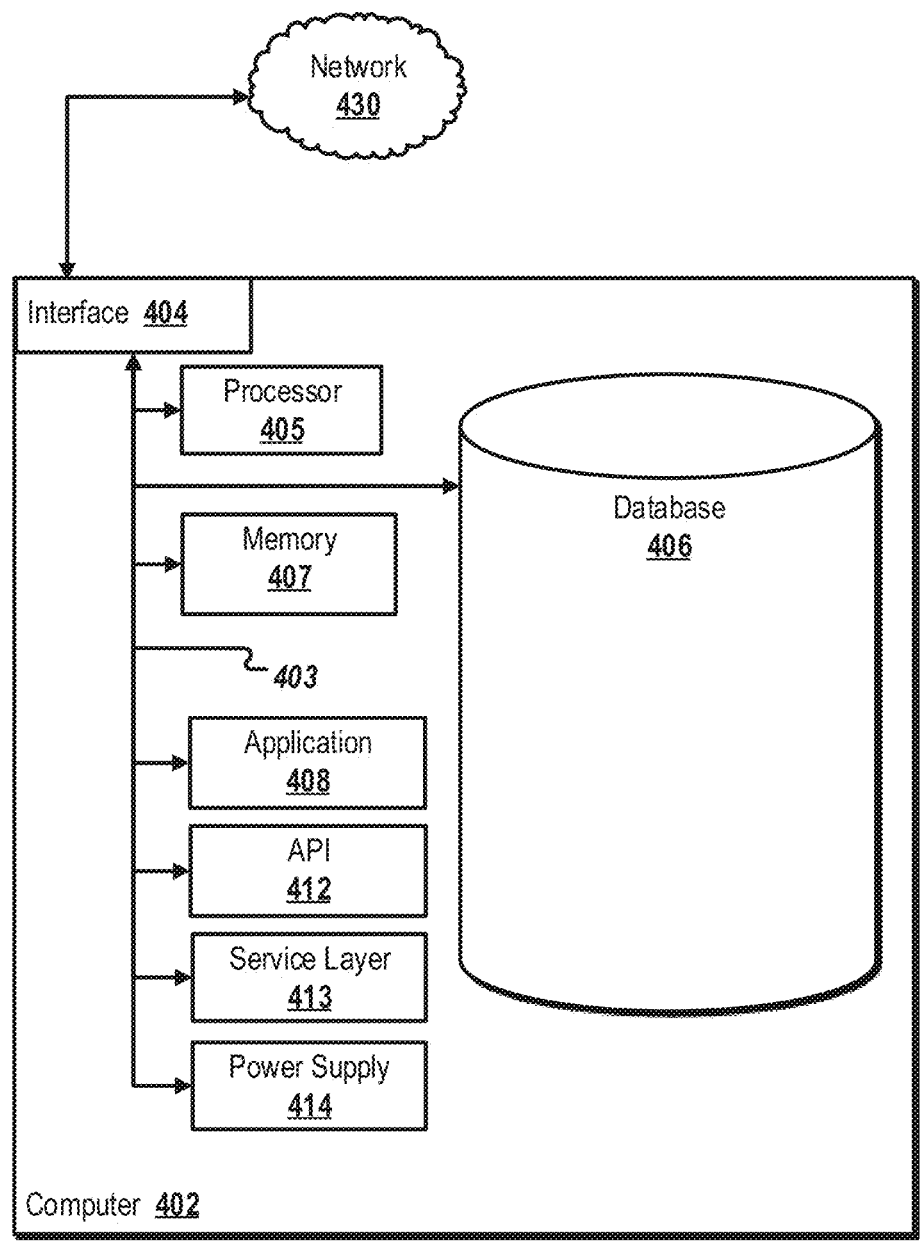
FIG. 4 is a block diagram illustrating an example of a computer-implemented system used to provide computational functionalities associated with described algorithms, methods, functions, processes, flows, and procedures, according to some implementations of the present disclosure.

FIG. 4 is a block diagram illustrating an example of a computer-implemented System 400 used to provide computational functionalities associated with described algorithms, methods, functions, processes, flows, and procedures, according to some implementations of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, comprising: receiving a seismic gather, wherein the seismic gather includes a plurality of seismic traces; generating a feature trace based on the plurality of seismic traces in the seismic gather; and for each of the plurality of seismic traces in the seismic gather: generating a correlation trace based on that seismic trace and the feature trace; modifying the correlation trace using an activation function; and generating an enhanced trace by multiplying that seismic trace with the modified correlation trace.

The foregoing and other described implementations can each, optionally, include one or more of the following features:

A first feature, combinable with any of the following features, wherein the seismic gather is a migrated common image gather.

A second feature, combinable with any of the previous or following features, wherein the feature trace is generated by summing the plurality of seismic traces in the seismic gather.

A third feature, combinable with any of the previous or following features, wherein the correlation trace is generated by multiplying that seismic trace and the feature trace over a window.

A fourth feature, combinable with any of the previous or following features, wherein the activation function is a sigmoid function.

A fifth feature, combinable with any of the previous or following features, wherein the modified correlation trace reduces unwanted components in that seismic trace.

A sixth feature, combinable with any of the previous or following features, further comprising: generating a seismic image based on the enhanced trace; and generating drilling parameters based on the seismic image.

In a second implementation, a non-transitory, computer-readable medium storing one or more instructions executable by a computer system to perform operations comprising: receiving a seismic gather, wherein the seismic gather includes a plurality of seismic traces; generating a feature trace based on the plurality of seismic traces in the seismic gather; and for each of the plurality of seismic traces in the seismic gather: generating a correlation trace based on that seismic trace and the feature trace; modifying the correlation trace using an activation function; and generating an enhanced trace by multiplying that seismic trace with the modified correlation trace.

The foregoing and other described implementations can each, optionally, include one or more of the following features:

A first feature, combinable with any of the following features, wherein the seismic gather is a migrated common image gather.

A second feature, combinable with any of the previous or following features, wherein the feature trace is generated by summing the plurality of seismic traces in the seismic gather.

A third feature, combinable with any of the previous or following features, wherein the correlation trace is generated by multiplying that seismic trace and the feature trace over a window.

A fourth feature, combinable with any of the previous or following features, wherein the activation function is a sigmoid function.

A fifth feature, combinable with any of the previous or following features, wherein the modified correlation trace reduces unwanted components in that seismic trace.

A sixth feature, combinable with any of the previous or following features, wherein the operations further comprise: generating a seismic image based on the enhanced trace; and generating drilling parameters based on the seismic image.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a seismic gather, wherein the seismic gather includes a plurality of seismic traces; generating a feature trace based on the plurality of seismic traces in the seismic gather; and for each of the plurality of seismic traces in the seismic gather: generating a correlation trace based on that seismic trace and the feature trace; modifying the correlation trace using an activation function; and generating an enhanced trace by multiplying that seismic trace with the modified correlation trace.

The foregoing and other described implementations can each, optionally, include one or more of the following features:

A first feature, combinable with any of the following features, wherein the seismic gather is a migrated common image gather.

A second feature, combinable with any of the previous or following features, wherein the feature trace is generated by summing the plurality of seismic traces in the seismic gather.

A third feature, combinable with any of the previous or following features, wherein the correlation trace is generated by multiplying that seismic trace and the feature trace over a window.

A fourth feature, combinable with any of the previous or following features, wherein the activation function is a sigmoid function.

A fifth feature, combinable with any of the previous or following features, wherein the one or more operations further comprise: generating a seismic image based on the enhanced trace; and generating drilling parameters based on the seismic image.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving a seismic gather, wherein the seismic gather includes a plurality of seismic traces;
   generating a feature trace based on the plurality of seismic traces in the seismic gather; and
   for each of the plurality of seismic traces in the seismic gather:
      generating a correlation trace based on that seismic trace and the feature trace, wherein the correlation trace includes a set of correlation coefficients, each correlation coefficient calculated using: (i) an inner product of a segment of the feature trace and a segment of that seismic trace, and (ii) a correlation window size, wherein the correlation window size is smaller than a length of the feature trace or that seismic trace;
      modifying the correlation trace using an activation function; and
      generating an enhanced trace by multiplying that seismic trace with the modified correlation trace.

2. The computer-implemented method of claim 1, wherein the seismic gather is a migrated common image gather.

3. The computer-implemented method of claim 1, wherein the feature trace is generated by summing the plurality of seismic traces in the seismic gather.

4. The computer-implemented method of claim 1, wherein the activation function is a sigmoid function.

5. The computer-implemented method of claim 1, wherein the modified correlation trace reduces unwanted components in that seismic trace.

6. The computer-implemented method of claim 1, further comprising:
   generating a seismic image based on the enhanced trace; and
   generating drilling parameters based on the seismic image.

7. A non-transitory, computer-readable medium storing one or more instructions executable by a computer system to perform operations comprising:
   receiving a seismic gather, wherein the seismic gather includes a plurality of seismic traces;
   generating a feature trace based on the plurality of seismic traces in the seismic gather; and
   for each of the plurality of seismic traces in the seismic gather:
      generating a correlation trace based on that seismic trace and the feature trace, wherein the correlation trace includes a set of correlation coefficients, each correlation coefficient calculated using: (i) an inner product of a segment of the feature trace and a segment of that seismic trace, and (ii) a correlation window size, wherein the correlation window size is smaller than a length of the feature trace or that seismic trace;
      modifying the correlation trace using an activation function; and
      generating an enhanced trace by multiplying that seismic trace with the modified correlation trace.

8. The non-transitory, computer-readable medium of claim 7, wherein the seismic gather is a migrated common image gather.

9. The non-transitory, computer-readable medium of claim 7, wherein the feature trace is generated by summing the plurality of seismic traces in the seismic gather.

10. The non-transitory, computer-readable medium of claim 7, wherein the activation function is a sigmoid function.

11. The non-transitory, computer-readable medium of claim 7, wherein the modified correlation trace reduces unwanted components in that seismic trace.

12. The non-transitory, computer-readable medium of claim 7, wherein the operations further comprise:
generating a seismic image based on the enhanced trace; and
generating drilling parameters based on the seismic image.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a seismic gather, wherein the seismic gather includes a plurality of seismic traces;
generating a feature trace based on the plurality of seismic traces in the seismic gather; and
for each of the plurality of seismic traces in the seismic gather:
generating a correlation trace based on that seismic trace and the feature trace, wherein the correlation trace includes a set of correlation coefficients, each correlation coefficient calculated using: (i) an inner product of a segment of the feature trace and a segment of that seismic trace, and (ii) a correlation window size, wherein the correlation window size is smaller than a length of the feature trace or that seismic trace;
modifying the correlation trace using an activation function; and
generating an enhanced trace by multiplying that seismic trace with the modified correlation trace.

14. The computer-implemented system of claim 13, wherein the seismic gather is a migrated common image gather.

15. The computer-implemented system of claim 13, wherein the feature trace is generated by summing the plurality of seismic traces in the seismic gather.

16. The computer-implemented system of claim 13, wherein the activation function is a sigmoid function.

17. The computer-implemented system of claim 13, wherein the one or more operations further comprise:
generating a seismic image based on the enhanced trace; and
generating drilling parameters based on the seismic image.

* * * * *